(12) United States Patent
Kwan et al.

(10) Patent No.: US 8,707,024 B2
(45) Date of Patent: Apr. 22, 2014

(54) METHODS AND SYSTEMS FOR MANAGING IDENTITY MANAGEMENT SECURITY DOMAINS

(75) Inventors: Nang Kon Kwan, Mountain View, CA (US); Chandrasekar Kannan, Mountain View, CA (US); Shuk Yee Ho, Mountain View, CA (US); Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1334 days.

(21) Appl. No.: 11/462,606

(22) Filed: Aug. 4, 2006

(65) Prior Publication Data

US 2007/0288747 A1 Dec. 13, 2007

Related U.S. Application Data

(63) Continuation-in-part of application No. 11/448,157, filed on Jun. 7, 2006, now abandoned.

(51) Int. Cl.
*H04L 29/00* (2006.01)

(52) U.S. Cl.
USPC ............... 713/156; 380/286; 705/51; 705/54; 726/10; 396/186

(58) Field of Classification Search
USPC ......... 380/286; 713/156; 705/51, 54; 726/10; 396/186
See application file for complete search history.

(56) References Cited

U.S. PATENT DOCUMENTS

| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |

(Continued)

FOREIGN PATENT DOCUMENTS

| WO | 9724831 | 7/1997 |
| WO | 0048064 A1 | 8/2000 |
| WO | 2007096590 A1 | 8/2007 |

OTHER PUBLICATIONS

U.S. Appl. No. 11/448,158, Nang Kon Kwan et al., filed Jun. 7, 2006.

(Continued)

*Primary Examiner* — Brandon Hoffman
*Assistant Examiner* — Michael D Anderson
(74) *Attorney, Agent, or Firm* — Lowenstein Sandler LLP (57) ABSTRACT

Embodiments of the present invention provide identity management security domains that may be used in an enterprise security system. A security domain provides a centralized registry of services provided by the enterprise security system. For example, certificate authorities and other services, such as key archives, and the like, in the enterprise security system may register information about themselves in the security domain. Authorized users can then discover the location of these services. In some embodiments, the security domain may provide an interface that indicates a topology between services of the enterprise security system. The security domain may also serve as a distribution point for security policies. A security policy may comprise information that indicates, for example, a set of trusted certificate authorities, certificate templates, certificate revocation lists, and the locations of the services in the enterprise security system.

17 Claims, 4 Drawing Sheets

(56) References Cited

U.S. PATENT DOCUMENTS

| | | | |
|---|---|---|---|
| 5,666,415 A | 9/1997 | Kaufman | |
| 5,721,781 A | 2/1998 | Deo et al. | |
| 5,745,576 A | 4/1998 | Abraham et al. | |
| 5,745,678 A * | 4/1998 | Herzberg et al. | 726/32 |
| 5,768,373 A | 6/1998 | Lohstroh et al. | |
| 5,862,310 A | 1/1999 | Crawford et al. | |
| 5,923,884 A | 7/1999 | Peyret et al. | |
| 5,937,066 A | 8/1999 | Gennaro et al. | |
| 5,943,423 A | 8/1999 | Muftic | |
| 5,991,411 A | 11/1999 | Kaufman et al. | |
| 5,991,882 A | 11/1999 | O'Connell | |
| 6,005,942 A | 12/1999 | Chan et al. | |
| 6,005,945 A | 12/1999 | Whitehouse | |
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,377,825 B1 | 4/2002 | Kennedy et al. | |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 * | 5/2006 | Kwan | 380/286 |
| 7,051,213 B1 | 5/2006 | Kobayashi et al. | |
| 7,085,386 B2 | 8/2006 | Audebert et al. | |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 | 6/2008 | Low et al. | |
| 7,437,757 B2 | 10/2008 | Holdsworth | |
| 7,451,921 B2 | 11/2008 | Dowling et al. | |
| 7,475,250 B2 | 1/2009 | Aull et al. | |
| 7,475,256 B2 | 1/2009 | Cook | |
| 7,480,384 B2 | 1/2009 | Peyravian et al. | |
| 7,502,793 B2 | 3/2009 | Snible et al. | |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 * | 8/2010 | Randle et al. | 713/153 |
| 7,822,209 B2 | 10/2010 | Fu et al. | |
| 7,860,243 B2 | 12/2010 | Zheng et al. | |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 * | 1/2002 | Felsher | 705/51 |
| 2002/0029343 A1 | 3/2002 | Kurita | |
| 2002/0056044 A1 | 5/2002 | Andersson | |
| 2002/0059144 A1 * | 5/2002 | Meffert et al. | 705/51 |
| 2002/0064095 A1 | 5/2002 | Momich et al. | |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 | 8/2002 | Bragstad et al. | |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 | 12/2002 | Buttiker | |
| 2003/0005291 A1 | 1/2003 | Burn | |
| 2003/0012386 A1 | 1/2003 | Kim et al. | |
| 2003/0028664 A1 | 2/2003 | Tan et al. | |
| 2003/0035548 A1 | 2/2003 | Kwan | |
| 2003/0056099 A1 | 3/2003 | Asanoma et al. | |
| 2003/0075610 A1 | 4/2003 | Ong | |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1 | 6/2003 | Aull et al. | |
| 2003/0115468 A1 | 6/2003 | Aull et al. | |
| 2003/0167399 A1 | 9/2003 | Audebert et al. | |
| 2003/0172034 A1 * | 9/2003 | Schneck et al. | 705/54 |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0088562 A1 | 5/2004 | Vassilev et al. | |
| 2004/0096055 A1 | 5/2004 | Williams et al. | |
| 2004/0103324 A1 | 5/2004 | Band | |
| 2004/0103325 A1 | 5/2004 | Priebatsch | |
| 2004/0120525 A1 | 6/2004 | Miskimmin et al. | |
| 2004/0144840 A1 | 7/2004 | Lee et al. | |
| 2004/0146163 A1 | 7/2004 | Asokan et al. | |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2005/0022123 A1 | 1/2005 | Constantino | |
| 2005/0033703 A1 | 2/2005 | Holdsworth | |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 | 6/2005 | Freeman et al. | |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010325 A1 | 1/2006 | Liu et al. | |
| 2006/0015933 A1 * | 1/2006 | Ballinger et al. | 726/10 |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 | 4/2006 | Punaganti Venkata et al. | |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crichton et al. | |
| 2006/0206932 A1 | 9/2006 | Chong | |
| 2006/0208066 A1 | 9/2006 | Finn et al. | |
| 2006/0226243 A1 | 10/2006 | Dariel | |
| 2006/0291664 A1 | 12/2006 | Suarez et al. | |
| 2006/0294583 A1 | 12/2006 | Cowburn et al. | |
| 2007/0014416 A1 | 1/2007 | Rivera et al. | |

(56) References Cited

U.S. PATENT DOCUMENTS

| | | |
|---|---|---|
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2008/0022086 A1 | 1/2008 | Ho |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

OTHER PUBLICATIONS

U.S. Appl. No. 11/446,956, Christina Fu et al., filed Jun. 6, 2006.
U.S. Appl. No. 11/448,179, Nang Kon Kwan et al., filed Jun. 7, 2006.
U.S. Appl. No. 11/447,196, Christina Fu et al., filed Jun. 6, 2006.
"ATM and Credit Card Notification", Feb. 2005 (internet archive) pp. 1-2, www.therareplaces.com/infgdes/money.atmnotif.htm.
"AMD Announces Specification for Open Platform Management Architecture", Feb. 28, 2005, pp. 1-2, http://www.thefreelibrary.com/AMD+Announces+Specification+for+Open+Platform+Management+Architecture-a0129342307.
Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.
Schneier, "Applied Cryptography: Protocols, Algorithms, and Source Code in C", 1996, John Wiley & Sons, Inc., Second Edition, pp. 455-456.
Zuccherato, Robert, "Elliptic Curve Cryptography Support in Entrust", May 9, 2000.
Red Hat Certificate System, http://www.redhat.com/f/pdf/rhas/DirSecProductSheetCertificateSystem.pdf, Jun. 2005.
PKCS#11 v2.20: Cryptographic Token Interface Standard, RSA Laboratories, Jun. 28, 2004 (see, e.g. Chapter 10, Objects) (see www.rsasecutiry.com, 407 pgs).
Cryptographic Message Syntax, R. Housley, Request for Comments (RFC) 2630, Network Working Group, the Internet Society, Jun. 1999.
Balfanz (Dirk ABalfanz, "Access Control for Ad-Hoc Collaboration", Princeton University Jan. 2001).
Schneier, Bruce. Applied Cryptography, Second Edition. 1996 John Wiley and Sons, pp. 480-481.

* cited by examiner

METHODS AND SYSTEMS FOR MANAGING IDENTITY MANAGEMENT SECURITY DOMAINS

RELATED APPLICATIONS

This application is a continuation-in-part of U.S. patent application Ser. No. 11/448,157, entitled "Methods and Systems for Managing Identity Management Security Domains," filed Jun. 7, 2006, now abandoned which is incorporated herein by reference This application is related to pending U.S. patent application Ser. No. 11/446,956, entitled "Methods and Systems For Key Escrow" filed Jun. 6, 2006 and commonly assigned, U.S. patent application Ser. No. 11/447,196, entitled "Methods And Systems For Secure Key Delivery," filed Jun. 6, 2006 and commonly assigned, and U.S. patent application Ser. No. 11/448,179, entitled "Profile Framework for Token Processing System," filed concurrently and commonly assigned.

FIELD

This invention generally relates to secure client-server systems. More particularly, the invention relates to managing security domains in enterprise security systems.

DESCRIPTION OF THE RELATED ART

Although smart cards are often compared to hard drives, they are "secured drives with a brain"—they store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810. ISO-7816 and subsequent standards cover manufacturing parameters, physical and electrical characteristics, location of the contact points, communication protocols, data storage, and more. Data layout and format, however, can vary from vendor to vendor.

Smart cards are a way to increase security especially for enterprise systems. Enterprise system often contain valuable information such as financial data, personnel records, strategies, etc., that may be critical for the entity administrating the enterprise system. Moreover, smart cards may offer a method to control access to data within the enterprise systems. Accordingly, the reasons to use smart card are plentiful.

However, there are drawbacks and disadvantages to smart cards. Typically, smart cards require sophisticated enterprise security systems to support the management of their security information. For example, in order to enroll a smart card, numerous tasks, such as generating keys and obtaining certificates, must be performed. Typically, a certificate authority is used to issue certificates that authenticate the identity of the smart card. In turn, the certificate authority may need to communicate with several other components, such as a directory server, key generator, etc. However, these communications can be difficult to secure and are generally configured manually by an administrator. This can be a complex and difficult task.

Therefore, there is a need to provide methods and systems for a security service, such as certificate authority, that is capable of automatically discovering the topology and status of its domain in which services can share the same security policies. In addition, it may also be desirable to provide methods and systems for automating the configuration of components that communicate with a certificate authority.

SUMMARY OF THE INVENTION

In accordance with one feature invention, a security domain manager shares the same security policies with members of its domain. A first module is configured to provide a digital certificate and a second module is configured to provide a registry of security domains to which a certificate authority belongs.

In accordance with another feature of the invention, a method for distributing a certificate revocation list by a security domain is provided. In particular, destinations for the certificate revocation list are retrieved from a security domain in the certificate authority. The certificate revocation list is then distributed to the destinations from the security domain.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute apart of this specification, illustrate embodiments of the invention and together with the description, serve to explain the principles of the invention. In the figures.

DESCRIPTION OF THE EMBODIMENTS

Embodiments of the present invention provide identity management security domains that may be used in an enterprise security system. A security domain provides a centralized registry of services and trust policies provided by the enterprise security system. For example, certificate authorities and other services, such as key archives, and the like, in the enterprise security system may register information about themselves in the security domain. Authorized users can then discover the location of these services. In some embodiments, the security domain may provide an interface that indicates a network-based or trust-based topology between services of the enterprise security system. The security domain may also serve as a distribution point for security policies. A security policy may comprise information that indicates, for example, a set of trusted root certificate authorities, certificate templates, certificate revocation lists, and the locations of the services in the enterprise security system.

Reference will now be made in detail to exemplary embodiments of the invention, which are illustrated in the accompanying drawings. Wherever possible, the same reference numbers will be used throughout the drawings to refer to the same or like parts. For simplicity and illustrative purposes, the principles of the present invention are described by referring mainly to exemplary embodiments thereof. However, one of ordinary skill in the art would readily recognize that the same principles are equally applicable to, and can be implemented in, all types of secure distributed environments and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present invention generally relate to an enterprise security (ES) system executing on a server with a security client executing on a user desktop (erg., Windows, Linux, Mac). The security client may be configured to interface with the ES system and provide an interface to manage a smart card, communicate with ES system, act as a proxy for application program data units (APDUs) sent between the ES system and the smart card, and display user interfaces (UIs) as the ES system directs (for example, prompting user for credentials and/or PIN, displaying smart card status, etc.).

The ES system may include a token management system (TMS, or a security server). The TMS may comprise a security client and security servers, such as a certificate authority, token key service, and data recovery manager. Thus, the TMS may be configured to act as the registration authority and to direct the entire enrollment process. The TPS may also be configured as the only entity in the ES system to construct the APDUs, which are the message format understood by the smart card. The TMS may interface with a token processing system (TPS) to a token key service (TKS) module, a data recovery manager (DRM) module and a certificate authority (CA) module through a firewall.

In various embodiments, smart cards (more generally tokens) may be configured to store an applet (a small application) and three keys. The three keys may be derived from a master key held by the manufacturer and the card identification number. The derivation of the keys may be implemented by applying a pre-defined function(s) to the master key and the card identification number. One of the keys may be a key encryption key, KEK. The security client may detect the presence of an inserted token in an associated card reader and inform TPS of the token.

The TPS may begin an initialization process that may include the TPS determining whether the applet on the token is outdated and whether the master key has changed since the three keys stored on the token were generated. If any of these conditions are true, the TPS may perform a "key update" in the event of the outdated master key and an "applet upgrade" in the event of outdated applet. As part of the update, the TPS may deliver new keys (derived within the TMS system from the new master key) and/or an updated applet to the token to be stored/injected therein.

The TPS may also determine that the token may need to be initialized with server-side generated keys and key archival for those generated keys. More specifically, the TPS may be configured to provide tools that allow a system administrator to set policies to manage users. For example, the system administrator may set a policy where a group of users may have their tokens be enrolled with server-side key generation and key archival of those generated keys.

Accordingly, the security client may transmit a serial number, card unique identification, or card identification (CID) to the TPS of the TMS. The TPS may be configured to forward the CID of the token to the TKS module. The TKS module may be configured to derive a series of keys based on the server master key and the CID. One of the derived keys is the key encryption key, KEK, which is configured to encrypt other secret keys. The TKS module is also configured to generate a key transport session key, KTSK. The TKS module may encrypt the key transport session key, KTSK, with the key encryption key, KEK, i.e., wrap, to arrive at a first encrypted or wrapped key transport session key, KEK (KTSK).

The TKS module may be initially configured to hold a public key of the DRM module, which for the sake of convenience and will be referred as the server transport key, STK. The TKS module may include an encrypted secure database where the server transport key, STK, is stored. The TKS module may wrap the key transport session key, KTSK, with the server transport key, STK, to arrive at a second wrapped key transport session key, STK(KTSK). The TKS module may forward the first wrapped key transport session key, KEK(KTSK) and the second wrapped transport session key STK(KTSK) to the TPS.

The TPS may be configured to forward the second wrapped server transport key, STK(KTSK) and the server-side key generation request to the DRM module while temporarily holding the first wrapped key transport session key, KEK (KTSK). The DRM module may be configured to generate an asymmetric key pair, i.e., a subject public and a subject private (SPuK/SPrivK, respectively) key pair, where the subject may represent a user, device, or other entity such as organization, association, etc.

The DRM module may retrieve a storage key, SK, which may be a permanent private storage key owned by the DRM module and generate a storage session key, SSK. The DRM module may encrypt or wrap the subject private key, SPrivK, with the storage session key, SSK, to arrive at a wrapped storage private key, SSK(SPrivK). The DRM module may also encrypt the storage session key, SSK, with the storage key, SK, to arrive at a wrapped storage session key, SK(SSK). The wrapped storage private key, SSK(SPrivK) and the storage session key, SSK, may then be archived or escrowed by the DRM module. The archived keys (SSK(SPrivK) and SK(SSK)) may be used for later recovery in the event of a lost or destroyed token.

The DRM module may then decrypt, i.e., unwrap, the second wrapped transport session key, STK(KTSK), with the complementary key of the server transport key, STK, stored in the DRM module to retrieve the key transport session key, KTSK. The DRM module may then wrap the subject private key, SPrivK, with the key transport session key as a wrapped private key, KTSK(SPrivK) and forward the wrapped private key, KTSK(SPrivK) and the subject public key, SPuK, to the TPS.

The TPS may forward the wrapped private key, KTSK (SPrivK) and the first wrapped key transport session key, KEK(KTSK), to the security client to write into the token. The forwarded wrapped keys (KEK(KTSK) and KTSK (SPrivK)) are received at the token to be injected therein. For the sake of completeness, the token may execute an applet that can retrieve the key encryption key, KEK, which the manufacturer had derived and stored or the TMS has updated and stored. Accordingly, the applet may unwrap the first wrapped key transport session key, KEK(KTSK) to retrieve the key transport session key, KTSK. The applet then uses the key transport session key to unwrapped the wrapped private key, KTSK(SPrivK) to retrieve the subject private key, SPrivK.

The TPS may be further configured to send a certificate enrollment request with the information regarding the subject public key, SPuK, to the CA module for certificates for the token. The TPS may subsequently forward received certificates from the CA module to the token. Subsequently, the certificates are written into the token.

Figure 1:
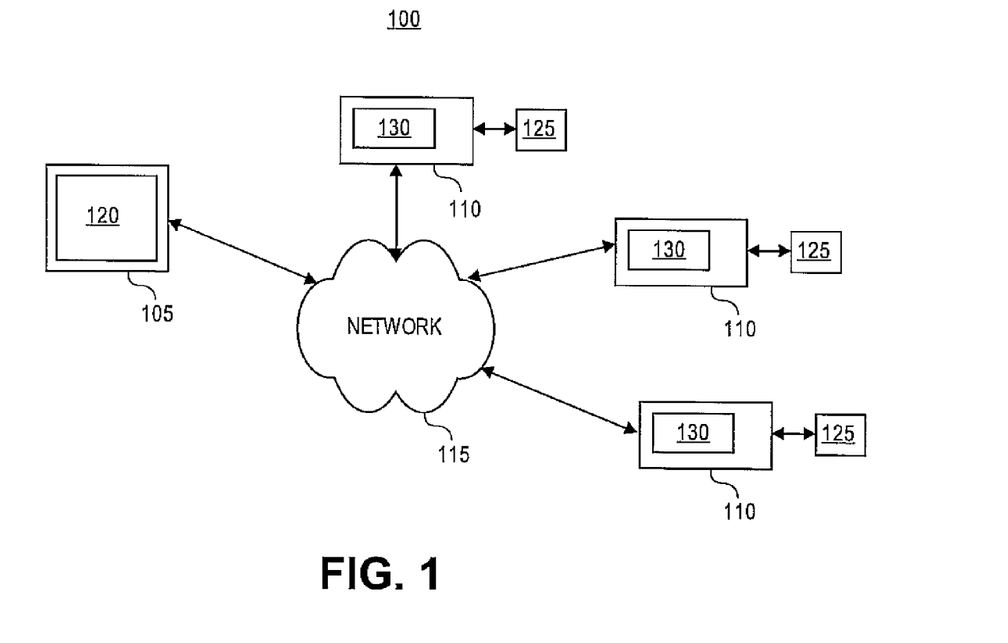
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform (machine) configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor the security device 125.

The security client 130 may be configured to manage the token. More specifically, the security client 130 may enroll the token, recovery keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token processing system 120 directs, i.e., prompting the user for credentials and/or PIN, displaying token status.

In some embodiments, the token management 120 may initiate token enrollment. The security client 130 may detect the presence of the inserted security token and notifies the token management system 120. The token management 120 may prompt the security client 130 to display a user interface querying the user to begin the enrollment process. The security client 130 may forward a card identification (CID) of the token. The CID uniquely identifies the token and is set during the manufacture of the token.

Figure 2:
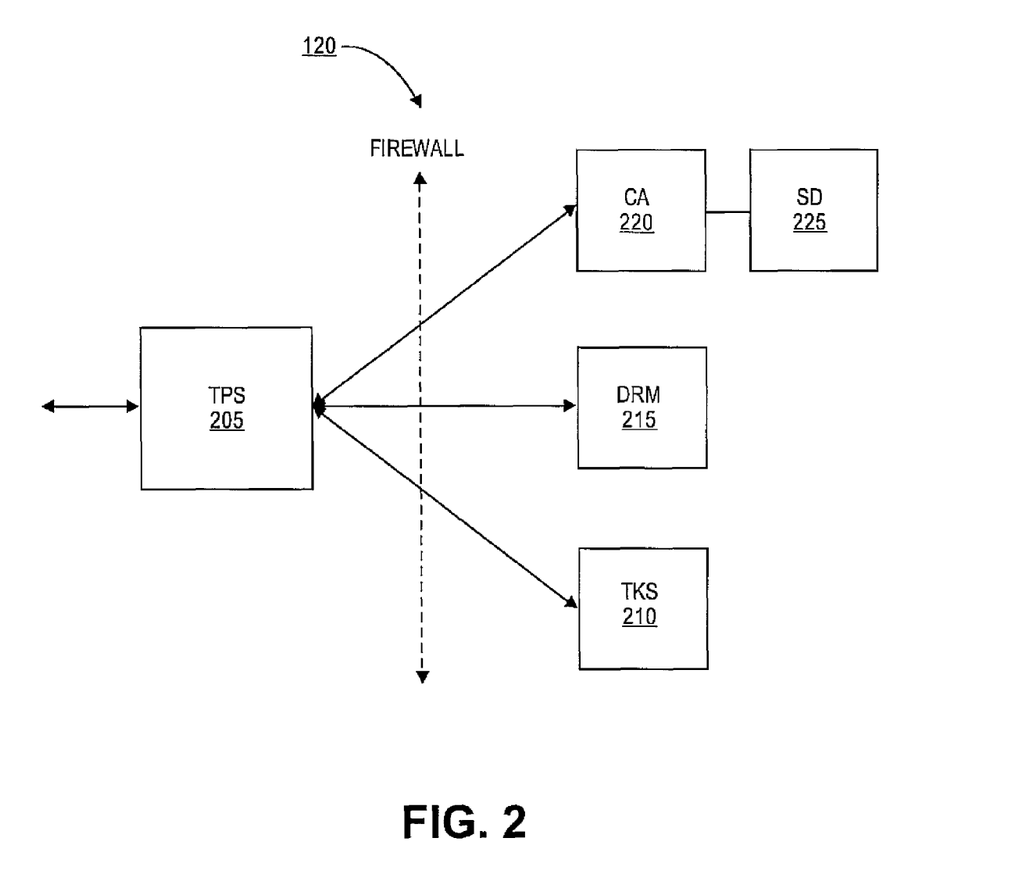
FIG. 2 illustrates an architectural diagram of the security client and server in accordance with another embodiment.

The token management system 120 comprises of several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager ARM) module 215 and a certificate authority (CA) module 220. These components will now be briefly described.

The TPS 205 may be configured to act as a registration authority. The TPS 205 may direct the enrollment process. The TPS 205 may be configured to act a gateway between security clients 130 and tokens and the modules of the token management system 120.

In some embodiments, the TPS 205 provides a configurable profile-based scheme to handle enrollment requests by using a profile database. This database may be stored locally on the TPS 205 or may reside on another machine, such as a dedicated server which is then remotely coupled to the TPS 205. Such a scheme may be desirable where the TPS 205 is coupled to multiple sets of CAs, KRAs, and TKSs, and the like. For example, each enrollment request from client 110 may comprise a list of parameters, such as an ATR, a CUID, a key version, an applet version, and profile identifier. The TPS 205 may then match these parameters to one or more of its profiles. The TPS 205 may select a profile based on the matches of the profile to the parameters provided in the enrollment request. The profile then indicates various aspects of enrollment, such as the number of keys to generate on the token, the token label, and the connection information between the applicable CA, DRM, and TKS to be used for managing the client 110.

For example, upon receiving an enrollment request from one of clients 110, the TPS 205 will typically establish a secure communication channel with client 110. To do that, the TPS 205 may connect to the TKS 210, which as has the master key for the client 110 that was used to create the keys on the token. Accordingly, the TPS 205 may query its profile database and determine which TKS to route the enrollment request. In addition, the TPS 205 may use its profile database to determine which CA to request a certificate and which DRM to use for key escrow. Of course other aspects of operations may be indicated in the profile framework used by the TPS 205.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210. For server side key generation requests, the manufacturer installed symmetric keys are replaced with the server generated keys which are derived the server master key. The TKS module 210 may also be configured to hold a public key of the DRM module 215 as a server transport key, STK, in an encrypted secure database.

The DRM module 215 may be configured to maintain a database of encrypted subjects private keys, which can be recovered on demand by an appropriate process. The DRM module 215 may also be configured to generate a subject public key (SPuK) and a subject private key (SPrivK), where the subject may represent a user, device, or other entity such as organization, association, etc. The DRM module 215 may be further configured to retrieve a storage key, SK. The storage key, SK, may be a private permanent storage key owned by the DRM module 215. The DRM module 215 may generate a storage session key, SSK, to encrypt the subject private key, SPrivK, with the storage session key, SSK, to arrive at a wrapped private key, SSK(SPrivK) and encrypt the storage session key, SSK, with the storage key, SK, to arrive at a wrapped storage session key, SK(SSK). These wrapped keys, SSK(SPrivK) and SK(SSK) are archived or escrowed for later recovery.

In general, CA module 220 is configured to issue and sign certificates. The CA module 220 may distribute and install certificates using well known Web protocols, such as HTTP and HTTPS. The CA module 220 may use the well-known standard RSA digital signatures. For example, the CA module 220 may be configured to generate certificates, such as X.509 certificates, in response to received subject public key information and certificate enrollment requests.

However, a security domain (SD) module 225 may also support customizable security policy templates that can be adapted for various certificate management policies and support automated online authentication checks against existing databases in token management system 120. In addition, the SD module 225 may support cross certification with other systems, and thus, support the creation and cross signing of another SD module in another system (not shown). The SD module 225 may also distribute certificates and certificate revocation lists (CRLs) to databases. As part of its services, the SD module 225 will typically be in communication with the other components of token management services 120 and other entities, such as a database.

The SD module 225 serves as a centralized registry of services that may be utilized by the CA module 220. For example, the CA module 220, the DRM module 215, and the TKS module 210 may register themselves with the SD module 225 to join the security domain. The SD module 225 may also issue corresponding certificates for these components so that the CA module 220 can authenticate itself to the other components that it attempts to securely communicate with. In some embodiments, these modules may include software that automates their registration with the SD module 225. For example, the registration by these components may be performed upon startup or installation and at periodic intervals thereafter. Of course, this registration may be manually initiated by an administrator or some other authorized party.

In general, a security domain may be any group of entities that share a common set of policies and have some form of trust relationship. Based on the registration, the SD module 225 may then provide a topology or list that indicates the topology of the security domain, such as the locations of components. For example, an administrator or some other authorized party may utilize a browser like application to access the SD module 225 and display the stored topology information and trust relationship between entities that belong in the security domain.

The SD module 225 may also serve as a distribution point for security policies. A security policy may comprise any information that indicates, for example, a set of trusted root certificate authorities, certificate templates, certificate revocation lists, and the locations of the services in the enterprise security system. Of note, the security policies may be arranged in various ways. For example, different security policies may share a peer-to-peer relationship or a parent-child relationship. Of course, other forms of relationships between security policies may be implemented by the SD module 225.

Accordingly, the SD module 225 provides a platform to automatically manage the security domains of token management system 120. Conventionally, an administrator of the token management system 120 would be required to manually configure the CA module 220 for secure communications with the other components of the token management system 120. However, with the use of the SD module 225, the CA module 220 may automatically discover the topology of the applicable security domain and commence communications with the other components. One skilled in the art will recognize that the security policy database may provide its information in a variety of forms that are LDAP-compliant or based on extensible markup language (XML).

In various embodiments, the TPS 205 may receive an enrollment request with a CID from the security client 130. The TPS 205 may forward the CID of the token 130 from the enrollment request to the TKS module 210. The TKS module 210 may be configured to derive a key encryption key, KEK, that is used in encrypting other secret keys intended for the specific token within the token management system 120. More particularly, the TKS module 120 may be configured to apply a pre-defined function is used to derive the key encryption key, KEK, based on the CID from the token 130. The TKS module 210 may also generate a key transport session key, KTSK. The TKS module 210 may encrypt the key transport session key (KTSK) with the key encryption key (KEK) to arrive at a first encrypted or wrapped key transport session key, KEK(KTSK).

The TKS module 210 may retrieve a server transport key, STK, where the server transport key may be a public key issued by the DRM module 215. The TKS module 210 may wrap the key transport session key, KTSK, with a server transport key, STK, to arrive at a second wrapped key transport session key, STK(KTSK). The TKS module 210 may forward the first wrapped key transport session key, KEK (KTSK) and the second wrapped key transport session key STK(KTSK) to the TPS 205.

The TPS 205 may be configured to forward the second wrapped key transport session key, STK(KTSK) and the server-side key generation request to the DRM module 215 while temporarily holding the first wrapped key transport session key, KEK(KTSK). The DRM module 215 may be configured to generate an asymmetric key pair, i.e., a subject public and a private (SPuK/SPrivK) key pair in response to receiving a server-side key generation request, where the subject may represent a user, device or other entity such as an organization, association, etc.

The DRM module 215 may also be configured to retrieve a storage key, SK, which is a permanent private storage key owned by the DRM module 215 and to generate a storage session key, SSK. The DRM module 215 may then wrap the subject private key, SPrivK with the storage session key, SSK, i.e., STK(SPrivK) and wrap the storage session key, SSK, with the storage key, SK, i.e., SK(SSK). The DRM module 215 may then archive or escrow these wrapped keys for later recovery in the event of a lost or destroyed token.

The DRM module 215 may be further configured to decrypt the second wrapped transport key, STK(KTSK), to obtain the key transport session key, KTSK with the complementary key of the of the server transport key used in the TKS module 210. The server transport key and its complementary key may be symmetric or asymmetric as long as they are shared between the DRM module 215 and the TKS module 210. The DRM module 215 may then wrap the subject private key, SPrivK, with the key transport session key, KTSK, as a wrapped private key, KTSK(SPrivK). The DRM module 215 may forward the wrapped private key, KTSK(SPrivK) and the subject public key, SPuK, to the TPS 205.

The TPS 205 may forward the wrapped private key, KTSK (SPrivK) and the first wrapped key transport session key, KEK(KTSK), to the security client 130 to write into the token. The forwarded wrapped keys (KEK(KTSK) and KTSK(SPrivK)) are received at the token to be injected therein. For the sake of completeness, the token may execute an applet that can retrieve the key encryption key. Accordingly, the applet may unwrap the first wrapped key transport session key, KEK(KTSK) to retrieve the key transport session key, KTSK. The applet then uses the key transport session key, KTSK, to unwrap the wrapped private key, KTK (SPrivK) to retrieve the subject private key, SPrivK. SPuK can either be injected or derived from SPrivK.

The TPS 205 may be further configured to send a certificate enrollment request along with information related to the subject public key, SPuK, to the CA module 220 for certificates for the token. The TPS 205 may subsequently forward received certificates from the CA module 220 to the security client 130. Subsequently, the certificates are written into the token.

Figure 3:
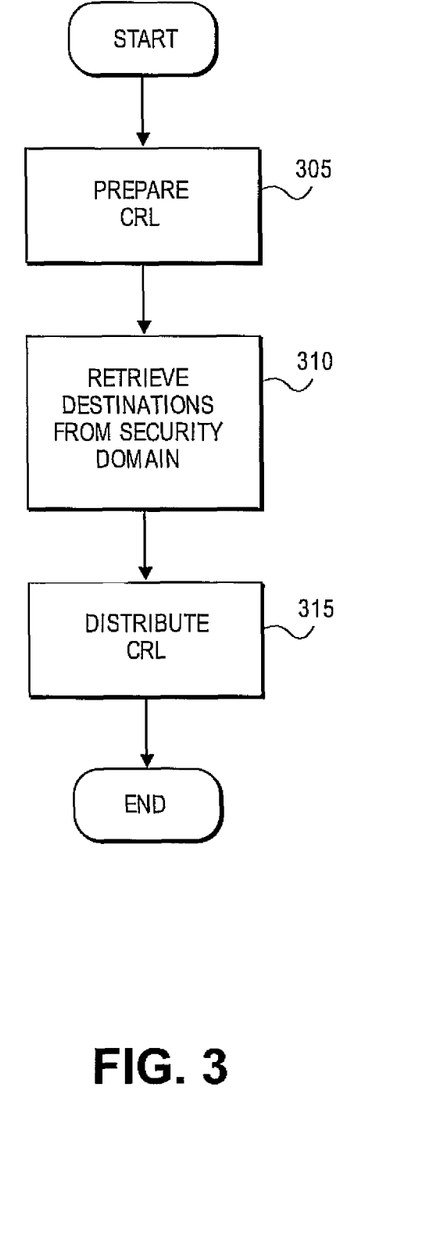
FIG. 3 illustrates an exemplary flow diagram in accordance with yet another embodiment.

FIG. 3 illustrate a flow diagram 300 executed by the token management system 120 in accordance with another embodiment. It should be readily apparent to those of ordinary skill in the art that the flow diagram 300 depicted in FIG. 3 represents a generalized illustration and that other steps may be added or existing steps may be removed or modified. In general, flow diagram 300 illustrates an exemplary process for utilizing a security domain to publish a CRL.

As shown in FIG. 3, in stage 305, the CA module 220 compiles and prepares a CRL for distribution. In stage 310, the CA module 220 communicates with the SD module 225 to determine where to distribute the CRL. For example, rather than making LDAP inquiries to a directory server, the SD module 225 may itself contain the locations of various registered entities or services that are to receive the CRL. In stage 315, the SD module 225 provides the destinations to the CA module 220. The CA module 220 may then distribute the CRL using well known protocols.

Figure 4:
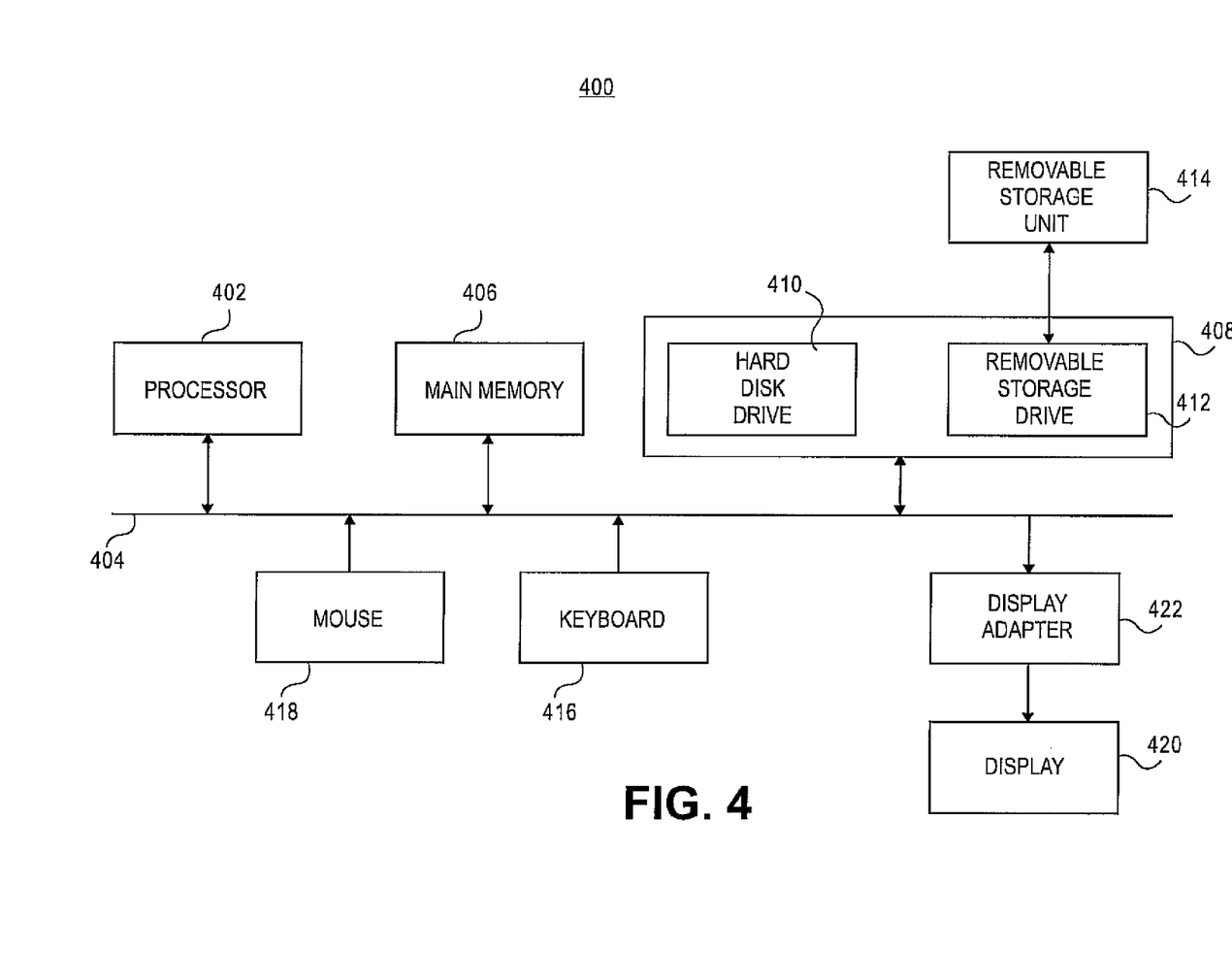
FIG. 4 illustrates an exemplary computing machine.

FIG. 4 illustrates an exemplary block diagram of a computing platform 400 where an embodiment may be practiced. The functions of the security client and token management system may be implemented in program code and executed by the computing platform 400. The security client and token management system may be implemented in computer languages such as PASCAL, C, C++, JAVA, etc.

As shown in FIG. 4, the computer system 400 includes one or more processors, such as processor 402 that provide an execution platform for embodiments of the security client and token management system. Commands and data from the processor 402 are communicated over a communication bus 404. The computer system 400 also includes a main memory 406, such as a Random Access Memory (RAM), where the security client and token management system may be executed during runtime, and a secondary memory 408. The secondary memory 408 includes, for example, a bard disk drive 410 and/or a removable storage drive 412, representing a floppy diskette drive, a magnetic tape drive, a compact disk drive, etc., where a copy of a computer program embodiment for the security client and token management system may be stored. The removable storage drive 412 reads from and/or writes to a removable storage unit 414 in a well-known manner. A user interfaces with the security client and token management system with a keyboard 416, a mouse 418, and a display 420. The display adapter 422 interfaces with the communication bus 404 and the display 420 and receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

What is claimed is:

1. A method, comprising:
    registering, by a certificate authority module executable by a processor, with a security domain module;
    in response to the registering, receiving, by the certificate authority module from the security domain module, a certificate allowing the certificate authority module to communicate with a plurality of entities of a security domain, wherein the security domain is registered with the security domain module, wherein the plurality of entities belong to the security domain, and wherein the plurality of entities have a plurality of associated certificates issued by the security domain module;
    determining, by the certificate authority module from the security domain module, which of the plurality of entities of the security domain are to receive a certificate revocation list;
    communicating, by the certificate authority module, with the security domain module to retrieve a plurality of locations of the plurality of entities receiving the certificate revocation list, wherein the plurality of locations of the plurality of entities are stored in storage associated with the security domain module; and
    establishing, by the certificate authority module, a communication with the plurality of entities using the plurality of associated certificates and the plurality of locations to distribute the certificate revocation list to the plurality of entities.

2. The method of claim 1, wherein communicating with the security domain module comprises submitting a LDAP-compliant request to the security domain module.

3. The method of claim 1, wherein communicating with the security domain module comprises submitting an XML request to the security domain module.

4. A non-transitory computer readable storage medium having instructions that, when executed by a processor, cause the processor to perform operations comprising:
    registering, by a certificate authority module executable by the processor, with a security domain module;

in response to the registering, receiving, by the certificate authority module from the security domain module, a certificate allowing the certificate authority module to communicate with a plurality of entities of a security domain, wherein the security domain is registered with the security domain module, wherein the plurality of entities belong to the security domain, and wherein the plurality of entities have a plurality of associated certificates issued by the security domain module;

determining, by the certificate authority module from the security domain module, which of the plurality of entities of the security domain are to receive a certificate revocation list;

communicating, by the certificate authority module, with the security domain module to retrieve a plurality of locations of the plurality of entities receiving the certificate revocation list, wherein the plurality of locations of the plurality of entities are stored in storage associated with the security domain module; and establishing, by the certificate authority module, a communication with the plurality of entities using the plurality of associated certificates and the plurality of locations to distribute the certificate revocation list to the plurality of entities.

5. A method comprising:

registering, by a security domain module executable by a processor, a security domain comprising a certificate authority and a plurality of other entities;

in response to the registering, issuing, by the security domain module, a plurality of certificates to the plurality of other entities;

receiving, by the security domain module, a communication from the certificate authority to distribute data to at least one of the plurality of other entities of the security domain, wherein the communication comprises a request for a location of the at least one of the plurality of other entities;

in response to receiving the request, retrieving, by the security domain module, the location of the at least one of the plurality of other entities from storage associated with the security domain module; and providing, by the security domain module, the location of the at least one of the plurality of other entities to the certificate authority to allow the certificate authority to distribute, via a communication established using a corresponding certificate issued to the at least one of the plurality of other entities, the data to the at least one of the plurality of other entities.

6. The method of claim 5, wherein the data is a certificate revocation list.

7. The method of claim 5, wherein the data is a certificate template.

8. The method of claim 5, wherein the data is information indicating a set of trusted root certificate authorities.

9. The method of claim 5, wherein the communication from the certificate authority is a LDAP-compliant communication.

10. The method of claim 5, wherein the communication from the certificate authority is an XML communication.

11. The method of claim 5, wherein the certificate authority and the plurality of other entities of the security domain share a common security policy.

12. A non-transitory computer readable storage medium having instructions that, when executed by a processor, cause the processor to perform operations comprising:

registering, by a security domain module executable by a processor, a security domain comprising a certificate authority and a plurality of other entities;

in response to the registering, issuing, by the security domain module, a plurality of certificates to the plurality of other entities;

receiving, by the security domain module, a communication from the certificate authority to distribute data to at least one of the plurality of other entities of the security domain, wherein the communication comprises a request for a location of the at least one of the plurality of other entities;

in response to receiving the request, retrieving, by the security domain module, the location of the at least one of the plurality of other entities from storage associated with the security domain module; and providing, by the security domain module, the location of the at least one of the plurality of other entities to the certificate authority to allow the certificate authority to distribute, via a communication established using a corresponding certificate issued to the at least one of the plurality of other entities, the data to the at least one of the plurality of other entities.

13. The non-transitory computer readable storage medium of claim 12, wherein the certificate authority and the plurality of other entities of the security domain share a common security policy.

14. The non-transitory computer readable storage medium of claim 4, wherein communicating with the security domain module comprises submitting a LDAP-compliant request to the security domain module.

15. The non-transitory computer readable storage medium of claim 4, wherein communicating with the security domain module comprises submitting an XML request to the security domain module.

16. A computer system comprising:
a memory; and
a processor coupled to the memory, wherein the processor is configured to:
register with a security domain module;
in response to the registering, receive a certificate allowing the certificate authority module to communicate with a plurality of entities of a security domain, wherein the security domain is registered with the security domain module, wherein the plurality of entities belong to the security domain, and wherein the plurality of entities have a plurality of associated certificates issued by the security domain module;
determine which of the plurality of entities of the security domain are to receive a certificate revocation list;
communicate with the security domain module to retrieve a plurality of locations of the plurality of entities receiving the certificate revocation list, wherein the plurality of locations of the plurality of entities are stored in storage associated with the security domain module; and
establish a communication with the plurality of entities using the plurality of associated certificates and the plurality of locations to distribute the certificate revocation list to the plurality of entities.

17. An enterprise security system comprising:
a memory; and
a processor coupled to the memory, wherein the processor is configured to:
register a security domain comprising a certificate authority and a plurality of other entities;

in response to the registering, issue a plurality of certificates to the plurality of other entities;

receive a communication from the certificate authority to distribute data to at least one of the plurality of other entities of the security domain, wherein the communication comprises a request for a location of the at least one of the plurality of other entities;

in response to receiving the request, retrieve the location of the at least one of the plurality of other entities from storage associated with the security domain module; and provide the location of the at least one of the plurality of other entities to the certificate authority to allow the certificate authority to distribute, via a communication established using a corresponding certificate issued to the at least one of the plurality of other entities, the data to the at least one of the plurality of other entities.

* * * * *